United States Patent [19]

Ryu et al.

[11] Patent Number: 4,984,884
[45] Date of Patent: Jan. 15, 1991

[54] METHOD FOR MEASURING DISPERSION CHARACTERISTICS OF AN OPTICAL FIBER

[75] Inventors: Shiro Ryu, Kanagawa; Kiyohumi Mochizuki, Hachioji; Yukio Horiuchi, Hiratsuka, all of Japan

[73] Assignee: Kokusai Denshin Denwa Co., Ltd., Tokyo, Japan

[21] Appl. No.: 347,614

[22] Filed: May 4, 1989

[30] Foreign Application Priority Data

May 18, 1988 [JP] Japan .................. 63-119267

[51] Int. Cl.$^5$ .................. G01N 21/84; G01N 21/41
[52] U.S. Cl. .................................. 356/73.1
[58] Field of Search ........................ 356/73.1

[56] References Cited

U.S. PATENT DOCUMENTS 4,710,022 12/1987 Soeda et al. .............. 356/73.1

FOREIGN PATENT DOCUMENTS 56-51635 5/1981 Japan .................. 356/73.1

Primary Examiner—Vincent P. McGraw
Attorney, Agent, or Firm—Jordan and Hamburg

[57] ABSTRACT

In measurement method of dispersion characteristics of an optical fiber, a laser for measurement connected to one end of the fiber and variable in output light wavelength and an oscillation for modulating a measurement light signal sent out from the laser are provided. The modulation frequency of the output from the oscillator is used as an reference electric signal. A measuring light signal obtained through the modulator 8 and transmitted through the fiber is converted into an measuring electric signal. And the characteristics is measured from the phase difference between the reference electric signal and the measuring electric signal, wherein an external modulator, an optical divider and a monitoring section are provided. The modulator modulates the measuring light signal sent out from the laser and having a narrow spectral linewidth. The divider divides the output light signal from the modulator, at a prescribed ratio. The measuring light signal obtained through the modulator is multiplexed with output light signal from a laser for monitoring by the section to generate a beat to measure the oscillation wavelength of the laser for measurement through optical heterodyne detection. And the characteristics is measured while the result of the measurement of the oscillation wavelength is compared with that of the measurement of the phase difference.

3 Claims, 4 Drawing Sheets

METHOD FOR MEASURING DISPERSION CHARACTERISTICS OF AN OPTICAL FIBER

BACKGROUND OF THE INVENTION

The present invention relates to a method for measuring the dispersion characteristics of an optical fiber to a light signal transmitted therein.

Since a laser which is a light source for emitting a light signal to be transmitted through an optical fiber for communication has a widely-spread frequency spectrum and the optical fiber has dispersion characteristics, the waveform of the light signal transmitted through the optical fiber from one end thereof and received at the other end thereof has a distortion even if the proper light signal is launched into the optical fiber at the transmitter end thereof. For that reason, there is a problem that the light signal is not received well at the receiver end of the optical fiber. Therefore, it is necessary to grasp the dispersion characteristics of the optical fiber in designing an optical communication system employing the optical fiber. Various measurement methods of the dispersion characteristics have been developed.

FIG. 3 shows a block diagram of a conventional for measuring the dispersion characteristics of an optical fiber. Shown in FIG. 3 are an oscillator 1 for supplying electrical modulation signals $S_1, S_2, \ldots$ and $S_N$ for laser for measurement $2_1, 2_2, \ldots$ and $2_N$ and an electric reference signal $S_{N+1}$ for a phase comparator 6, the laser for measurement which emit N light signals of different wavelengths in wavelength bands for measurement, an optical switch 3 for sequentially changing over the output light signals from N numbers of the laser for measurement $2_1, 2_2, \ldots 2_N$, the optical fiber 4 to be measured, a light reiver 5 by which a intensity-modulated light signal coming out from the optical fiber 4 is converted into an demodulated electrical signal D, the phase comparator 6 for detecting the phase difference between the electric demodulated electrical signal D and the reference electrical signal $S_{N+1}$, output signal S corresponding to the difference, and optical fiber $F_1, F_2, \ldots$ and $F_N$. The output light signals from the laser for measurement $2_1, 2_2, \ldots$ and $2_N$ are subjected to intensity modulation based on the modulation frequency $F_0$ of the oscillator 1, and are then sent to the optical fiber 4 through the other otical fibers $F_1, F_2, \ldots$ and $F_N$ and the optical switch 3 so that the light signals enter one after another into the optical fiber 4. The light receiver 5 sequentially receives the light signals transmited through the optical fiber 4 and converts the signals into the electrical signals $S_1, S_2, \ldots$ and $S_N$ which are the demodulated electrical signals D. The phase differences between the reference electrical signal $S_{N+1}$ and the demodulated electrical signals D are sequentially detected by the phase comparator 6 to measure the dispersion characteristics of the optical fiber 4. However, since the light signals and the reference electrical signal $S_{N+1}$ are transmitted through mutually different media to perform the measurement as shown in FIG. 3, the fluctuation in the phases of the demodulated electrical signals, D, which is caused when the otical fiber 4 to be measured expands or contracts due to the change in the temperature or the like, cannot be prevented from affecting the result of the measurement. This is a problem.

FIG. 4 shows a block diagram of another conventional method for measuring the dispersion characteristics of an optical fiber 4. In the method, an optical reference signal and measuring light signals are transmitted through the optical fiber 4. A light signal generated by a reference laser $2_0$ and having a wavelength of $1.3\mu$ which is nearly equal to the zero-dispersion wavelength of the optical fiber 4, is modulated at a frequency $f_0$ so that the optical reference signal is obtained. Light signals generated by laser for measurement $2_1, 2_2, \ldots$ and $2_N$ are modulated at the frequency $f_0$ so that the measuring light signals are obtained. The measuring light signals are sequentially sent to an optical multiplexer 13 through an optical switch 3 so that each of the signals is multiplexed with the optical reference signal by the multiplexer 13, the output light signal from which is transmitted through the optical fiber 4 and received by an optical demultiplexer 7 which demultiplexes the received light signal into the optical reference signal and the measuring light signal which are converted into demodulated electrical signals Da and Db by light receivers 5a and 5b, respectively. Since the wavelength of the output light signal from the laser for reference $2_0$ is nearly equal to the zero-dispersion wavelength of the optical fiber 4, the signal is hardly affected by the dispersion characteristics of the fiber. The output light signals from both the laser for reference $2_0$ and the laser for measurement $2_1, 2_2, \ldots$ and $2_N$ are equally affected by the expansion and contraction of optical fiber 4. The demodulated electrical signals Da and Db are differentially multiplexed with each other by a phase comparator 6. As a result, the dispersion characteristics of the optical fiber 4 can be measured without being affected by the expansion and contraction of the fiber. However, since direct modulation is performed for the laser for reference $2_0$ and the laser for measurement $2_1, 2_2, \ldots$ and $2_N$, a spectral spread, which is affected by the dispersion characteristics of the optical fiber 4, is caused. For that reason, it is difficult to measure dispersion characteristics of the fiber 4 with a high resolution. This is a problem. Although the wavelengths of the output light signals from the laser for measurement $2_1, 2_2, \ldots$ and $2_N$ are separately measured in advance to determine the dispersion characteristics of the optical fiber 4 on the basis of the measured wavelengths, the wavelengths change due to ambient conditions such as temperature so that it is difficult to accurately measure the wavelengths. For the reason, there is another problem that the influence of the dispersion characteristics of the optical fiber 4 cannot be accurately compensated by using a dispersion compensation circuit having a property inverse to the dispersion characteristics of the fiber in the intermediate frequency band or the baseband.

SUMMARY OF THE INVENTION

The present invention was made in order to solve the abovementioned problems.

Accordingly, it is an object of the present invention to provide a method in which the dispersion characteristics of an optical fiber are accurately measured with a high resolution. In the method, a semiconductor laser such as a distributed feedback semiconductor laser and a distributed reflector semiconductor laser, which is good in single longitudinal mode oscillation and has a narrow spectral linewidth, is used as a light source. The wavelength of the output light signal from the laser can be adjusted. Besides, an external modulator is used for optical intensity modulation. Consequently, the spectral spread of the output light signal from the semiconductor laser unit is suppressed. The wavelength of the output light signal from the laser is measured by a monitoring system employing optical heterodyne detection. As a result, the dispersion characteristics of the optical fiber can be accurately measured with high resolution. For that reason, the present invention can be widely applied to the design of a dispersion compensation circuit for coherent light communication or the like.

DETAILED DESCRIPTION OF EXEMPLARY EMBODIMENTS

Embodiments of the present invention are hereafter described in detail with reference to the drawings attached hereto.

Figure 1:
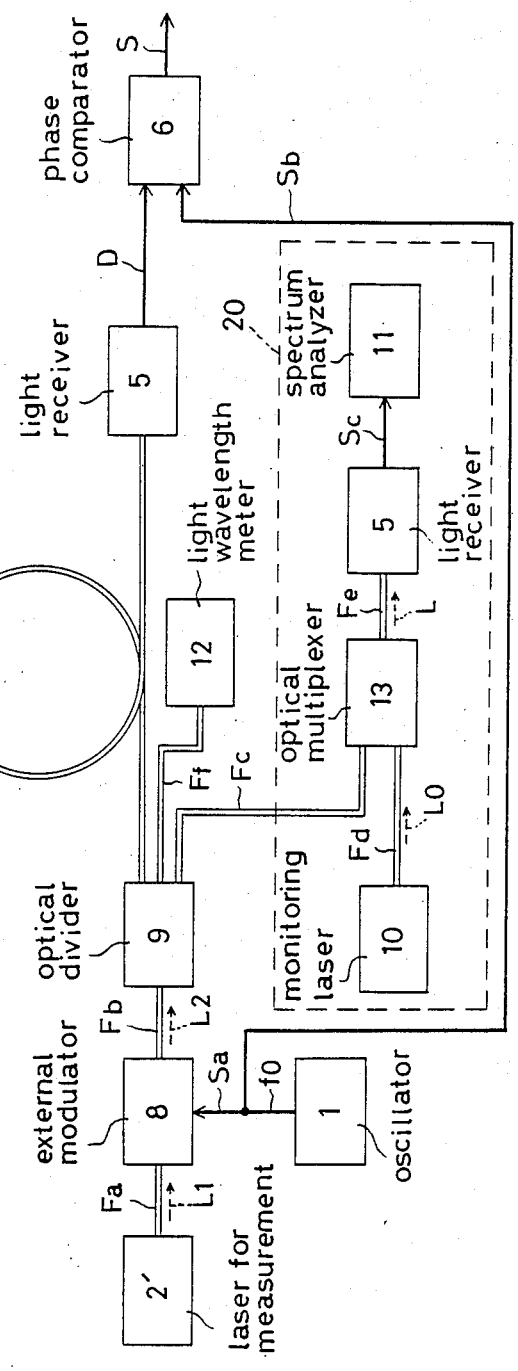
FIG. 1 shows a block diagram of an optical fiber dispersion characteristics measurement method which is an embodiment of the present invention.

FIG. 1, shows a block diagram of a method for measuring the dispersion characteristics of an optical fiber 4. The method is one of the embodiments. In the method, an oscillator 1, a laser 2 for measurement, light receivers 5 and 5c, a phase comparator 6, an external modulator 8, an optical divider 9, a laser for monitoring 10, a spectrum analyzer 11, a light wavelength meter 12, an optical multiplexer 13 and optical fibers Fc, Fd, Fe and Ff are disposed. The laser 2' for measurement is a distributed feedback semiconductor laser or a distributed reflector semiconductor laser. The external modulator 8 and an electrical modulation signal Sa supplied from the oscillator 1 act together so that a measuring light signal $L_1$ emitted from the laser for measurement 2' and transmited through an optical fiber Fa undergoes intensity modulation without increasing the spectrum width of the light signal. A measuring light signal L2 sent out from the external modulator 8 and transmitted through an optical fiber Fb is divided into three light signals at an appropriate ratio by the optical divider 9. The laser 10 for monitoring serves so that the wavelength of the measuring light signal L1 emitted from the laser 2' for measurement is measured through optical heterodyne detection. The spectrum analyzer 11 serves to monitor the difference between the wavelength of the output light signal from the laser 2' for measurement and that of the output light signal from the laser 10 for monitoring. The light wavelength meter 12 roughly measures the wavelength of the output light signal from the laser 2' for measurement to determine the wavelength of the output light signal from the laser 10 for monitoring. An electrical reference signal Sb is supplied from the oscillator 1 to the phase comparator 6. An electrical intermediate frequency signal Sc is supplied from the light receiver 5c to the spectrum analyzer 11. A monitoring section 20, which is one of the features of the invention and performs the measurement based on the optical heterodyne detection, is composed of laser 10 for monitoring, the optical multiplexer 13, the light receiver 5c and the spectum analyzer 11. The laser 2' for measurement is the distributed feedback semiconductor laser or the distributed reflector semiconductor laser, which is good in single longitudinal mode oscillation and narrow in spectral linewidth. Since the output light signal from the laser 2' for measurement is modulated by the external modulator 8, the spectral linewidth of the output light signal is not affected by the dispersion characteristics of the optical fiber 4. For that reason, the influence of the spectral spread of the output light signal from the laser 2' upon the measurement of the dispersion characteristics of the optical fiber 4 is reduced.

Although the laser 2' for measurement and the external modulator 8 are separately provided in the laser and the modulator may be integrated with each other.

The wavelength of the measuring light signal L1 emitted from the laser 2' for measurement is measured by the light wavelength meter 12. The driving electrical current or temperature of the laser 10 for monitoring of the monitoring section 20 is then controlled so that the difference between the wavelength of the output light signal from the laser and that of the output light signal L1 from the laser 2' for measurement is made small enough. One of the measuring light signals L2 divided by the optical divider 9 and monitoring light signal L2 divided by the optical divider 9 and a laser 10 for monitoring of the monitoring section 20 is then controlled so that the difference between the wavelength of the output light signal from the laser and the of the output light signal L1 from the laser 2' for measurement is made small enough. One of the measuring light signals L2 divided by the optical divider 9 and a monitoring light signal L0 emitted from the monitoring laser 10 are multiplexed with each other by the optical multiplexer 13 so that a beat signal L is generated from the signals L2 and L0. The beat signal L is photoelectrically converted into the electrical intermediate frequency signal Sc by the light reciver 5c. The signal Sc is observed by the spectrum analyzer 11. After that, the wavelength of the measuring light signal L1 from the laser 2' for measurement is gradually changed. The change in the wavelength of the signal L1 is observed by the spectrum analyzer 11 starting with the first wavelength of the signal. Besides, the output signal from the phase comparator 6 is measured. As a result, the dispersion characteristics of the optical fiber 4 can be accurately measured with a high resolution.

When the difference between the wavelength of the output light signal from the laser 2' for measurement and that of the output light signal from the monitoring laser 10 exceeds the measurement bandwidth of the light receiver 5c, it becomes impossible to measure the change in the wavelength of the output light signal from the laser 2' for measurement, from the initial value of the wavelength. If the change is to be measured in such a case, the wavelength of the output light signal from the laser 10 for monitoring is caused to approach that of the output light signal from the laser for measurement 2' when the difference between both the wavelengths has become a certain value, so that the frequency of the electrical intermediate frequency signal Sc is lowered, then measuring the change. By repeating such a process, the dispersion characteristics of the optical fiber 4 can be accurately measured with a high resolution in a wide range.

Figure 2:
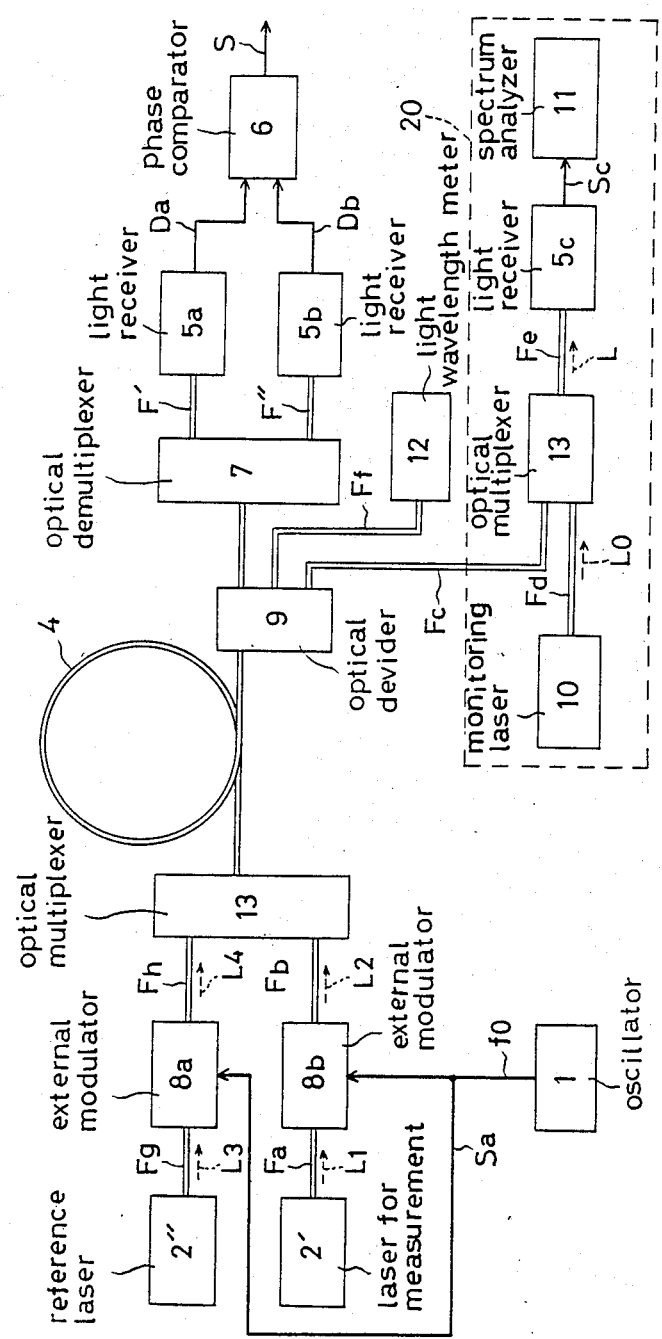
FIG. 2 shows a block diagram of an optical fiber dispersion characteristics measurement method which is another embodiment of the present invention.
Figure 3:
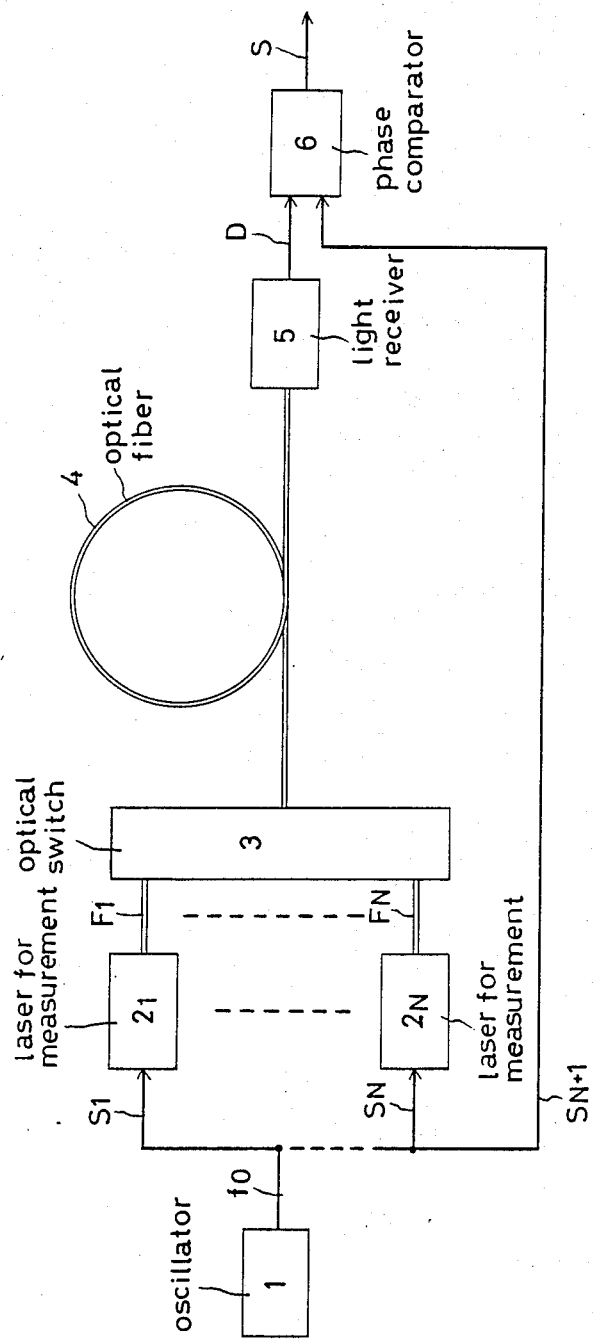
FIG. 3 shows a block diagram of a conventional optical fiber dispsersion characteristics measurement method.
Figure 4:
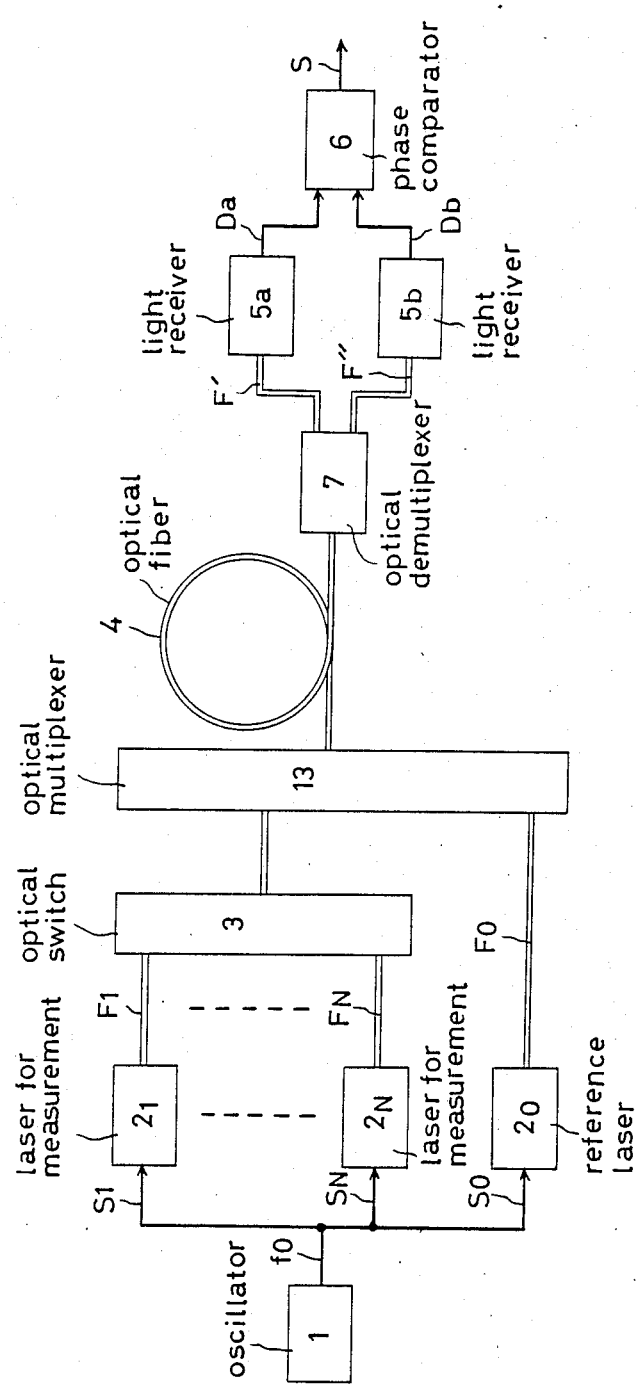
FIG. 4 shows a block diagram of another convenional optical fiber dispersion characteristics measurement method which is not affected by the expansion and contraction of a measured optical fiber.

FIG. 2 shows a block diagram of a method for measuring the dispersion characteristics of an optical fiber 4. The method is the other of the embodiments. Since a reference laser is not provided in the preceding embodiment, the expansion and contraction of the optical fiber 4 cannot be prevented from affecting the result of the measurement of the dispersion characteristics of the fiber 4, for the above-mentioned reason. In the method shown in FIG. 2, a reference light signal obtained on the basis of the output light signal L3 from a laser 2' for reference is transmitted through the optical fiber 4, and a monitoring section 20 employing optical heterodyne detection is provided at the signal reception end of the fiber 4 so as to perform measurement at the far end. The reference light signal L3 from the laser 2" for reference and the measuring light signal L1 from a laser 2' for measurement are modulated into a reference light signal L4 and a measuring light signal L2 by external modulators 8a and 8b, respectively as in the conventional art FIG. 4. An optical demultiplexer 7 and light receivers 5a and 5b are used to obtain demodulated signals Da and Db. Other optical fibers Fg and Fh are provided.

In the method shown in FIG. 2, the output light signal L3 from laser 2" for reference is subjected to external modulation by the external modulator 8a. However, since the wavelength of the output light signal 13 from the laser 2" for reference is near the zero-dispersion wavelength of the optical fiber 4, which is 1.3μm, the signal does not necessarily need to be subjected to the external modulation but may be subjected to direct modulation. In contrast with that, the output light signal L1 from the measuring laser 2' fo needs to be subjected to external modulation by the external modulator 8b, because the wavelength of the signal L1 is near the lowloss wavelength of the fiber 4, which is 1.55μm.

Thus, the present invention is possible to control oscillation wavelength as a measuring light source and use a narrow spectral linewidth laser of a distributed feedback semiconductor laser or a distributed reflector semiconductor laser having the property of single longitudinal mode oscillation. By employing an external modulation for light intensity modulation, it is possible to make light occupying narrow bandwidth for the measurement. Futhermore, by means optical heterodyne detection as monitoring means of oscillating wavelength, the dispersion characteristics of the optical fiber can be accurately measured with high resolution.

Accordingly, the present invention is able to adapt widely in designing the dispersion compensation circuit for coherent optical communication. So the effect will bring very large merits.

What is claimed is:

1. A method for measuring the dispersion characteristics of an optical fiber, comprising modulating light of a measuring laser with oscillations from an oscillator, to provide an output with a narrow spectral bandwidth, and applying the modulated light to one end of said fiber via an optical divider, whereby said divider divides the modulated signals at a predetermined ratio, the output of the measuring laser being variable in output light wavelength; employing the modulation frequency of the output from said oscillator as a reference electrical signal; converting the measuring light signal transmitted through said fiber to provide a measuring electrical signal; and measuring said characteristics by measuring the phase difference between said reference electrical signal and said measuring electrical signal, multiplexing divided modulated signals with an output light signal from a monitoring laser to generate a beat to measure the oscillation wavelength of said measuring laser by optical heterodyne detection; and comparing the result of the measurement of said oscillation wavelength with that of the measurement of said phase difference.

2. A method for measuring the dispersion characteristics of an optical fiber, comprising obtaining a measuring light signal by modulating the output light signal from a semiconductor measuring laser and the output light signal from a semiconductor reference laser, and multiplexing the modulated light signals for application to one end of said fiber, receiving light at the other end of the fiber and converting a first portion thereof into a measuring electrical signal and a reference electrical signal and measuring the phase difference between said measuring electrical signal and said reference electrical signal, said output light signal from said measuring laser having a narrow spectral linewidth, and said output light signal from said reference laser having a narrow spectral linewidth, roughly measuring the wavelength of said received light signal with a meter; multiplexing the output light signal from a monitoring laser and said measuring light signal with each other to generate a beat to accurately measure the wavelength of said measuring light signal by optical heterodyne detection, and adjusting the oscillation wavelength of said monitoring laser on the basis of the measurement with said meter.

3. A method according to claim 2, wherein the reference light signal is obtained by subjecting the output signal from the reference laser to direct modulation; and the measuring light signal is obtained by modulating the output light signal from the measuring laser by an external modulator.

* * * * *